(12) United States Patent
Kawabata et al.

(10) Patent No.: US 9,169,542 B2
(45) Date of Patent: Oct. 27, 2015

(54) RECYCLED MAGNESIUM ALLOY, PROCESS FOR PRODUCING THE SAME, AND MAGNESIUM ALLOY

(75) Inventors: Hiroyuki Kawabata, Owariasahi (JP); Naohisa Nishino, Seto (JP); Sonoko Nishino, legal representative, Seto (JP); Yasushi Iwata, Miyoshi (JP); Yoshikazu Genma, Toyota (JP); Tsuyoshi Seguchi, Toyota (JP)

(73) Assignees: KABUSHIKI KAISHA TOYOTA CHUO KENKYUSHO, Aichi-ken (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/378,938

(22) PCT Filed: Jun. 9, 2010

(86) PCT No.: PCT/JP2010/003838
§ 371 (c)(1),
(2), (4) Date: Dec. 16, 2011

(87) PCT Pub. No.: WO2010/146804
PCT Pub. Date: Dec. 23, 2010

(65) Prior Publication Data
US 2012/0156087 A1 Jun. 21, 2012

(30) Foreign Application Priority Data
Jun. 17, 2009 (JP) .................................. 2009-144725

(51) Int. Cl.
*C22C 23/02* (2006.01)
*C22B 26/22* (2006.01)
(Continued)

(52) U.S. Cl.
CPC ................. *C22C 23/02* (2013.01); *C22B 7/003* (2013.01); *C22B 9/00* (2013.01); *C22B 26/22* (2013.01); *C22C 23/04* (2013.01); *C22F 1/06* (2013.01); *Y02W 30/54* (2015.05)

(58) Field of Classification Search
USPC ............................................. 75/600; 420/409
See application file for complete search history.

(56) References Cited

U.S. PATENT DOCUMENTS 2,264,309 A 12/1941 Hanawait et al.
2,264,310 A 12/1941 Hanawait et al.
(Continued)

FOREIGN PATENT DOCUMENTS

CN 1614064 A 5/2005
CN 101058860 A 10/2007
(Continued)

OTHER PUBLICATIONS

Scharf et al.; "Application of remelted Post Consumer Scrap for Structural Magnesium Parts;" *Magnesium: Proceedings of the 6th International Conference Magnesium Alloys and Their Applications*; Jan. 1, 2004; pp. 980-987.
(Continued)

*Primary Examiner* — Kaj K Olsen
*Assistant Examiner* — Alexander Polyansky
(74) *Attorney, Agent, or Firm* — Oliff PLC (57) ABSTRACT

This invention aims to provide a recycled magnesium alloy having a good corrosion resistance and a process for producing the same. The process of the present invention comprises an adjusting step of adjusting composition of molten metal of a magnesium alloy so as to comprise, by mass: Al: 5 to 10%, Zn: not less than 1% and not less than three times of Cu content (%), Mn: 0.1 to 1.5% and the remainder: Mg and impurities with or without one or more reforming elements. While the upper limit of the Al content is restricted to a low level, the Zn content is increased in accordance with the Cu content. Therefore, the recycled magnesium alloy produced by this process can effectively suppress corrosion caused by Cu, which is one of corrosion-causing elements.

6 Claims, 2 Drawing Sheets

(51) Int. Cl.
  *C22B 7/00* (2006.01)
  *C22B 9/00* (2006.01)
  *C22C 23/04* (2006.01)
  *C22F 1/06* (2006.01)

(56) References Cited

U.S. PATENT DOCUMENTS

| | | |
|---|---|---|
| 2,314,852 A | 3/1943 | Brandt |
| 2,413,928 A | 1/1947 | Simpson |
| 3,291,656 A | 12/1966 | Mann et al. |
| 5,073,207 A | 12/1991 | Faure et al. |
| 6,395,224 B1 | 5/2002 | Nishino et al. |
| 2007/0178006 A1 | 8/2007 | Saikawa et al. |
| 2008/0175744 A1 | 7/2008 | Motegi et al. |
| 2009/0104070 A1 | 4/2009 | Ditze et al. |
| 2009/0269236 A1 | 10/2009 | Blawert et al. |

FOREIGN PATENT DOCUMENTS

| | | |
|---|---|---|
| CN | 101248201 A | 8/2008 |
| DE | 1 236 210 B | 3/1967 |
| EP | 1 847 626 A2 | 10/2007 |
| GB | 431054 A | 6/1935 |
| JP | A-03-097824 | 4/1991 |
| JP | A-3-97824 | 4/1991 |
| JP | A-5-34411 | 2/1993 |
| JP | A-06-228698 | 8/1994 |
| JP | A-8-134581 | 5/1996 |
| JP | A-2000-201728 | 7/2000 |
| JP | A-2007-070685 | 3/2007 |
| JP | A-2007-070686 | 3/2007 |
| JP | A-2009-501845 | 1/2009 |
| JP | A-2009-120883 | 6/2009 |
| JP | A-2009-263792 | 11/2009 |
| SU | 473761 A | 10/1975 |
| WO | WO 2007/009435 | 1/2007 |

OTHER PUBLICATIONS

Hillis et al.; "The Effects of Heavy Metal Contamination on Magnesium Corrosion Performance;" Society of Automotive Engineers; Feb. 1, 1983.
Hillis et al.; "High Purity Magnesium AM60 Alloy: The Critical Contaminant Limits and the Salt Water Corrosion Performance;" Society of Automotive Engineers; Feb. 1, 1986.
Blawert et al.; "Influence of the Copper Content on Microstructure and Corrosion Resistance of AZ91 Based Secondary Magnesium Alloys;" SAE Technical Paper Series, SAE Congress; Apr. 3-6, 2006; Detroit Michigan.
International Search Report dated Dec. 1, 2010 in International Application No. PCT/JP2010/003838.
Written Opinion of the International Search Report dated Dec. 1, 2010 in International Application No. PCT/JP2010/003838.
Jul. 30, 2013 Notification of Reasons for Refusal issued in Japanese Application No. 2010-118493 with English-language translation.
Huang et al., China Material Engineering Canon, vol. 4, Nonferrous Material Engineering (vol. 1), Chapter 3, Cast Magnesium Alloy, Edition 1, pp. 176-178, Jan. 2006 with partial English-language translation.
Jun. 5, 2014 Notification of Second Office Action issued in Chinese Application No. 201080028398.X with English-language translation.
Nov. 20, 2013 Notification of the First Office Action issued in Chinese Application No. 201080028398.X with English-language translation.
Huang et al., China Material Engineering Canon, vol. 4, Nonferrous Material Engineering (vol. 1), Chapter 3, Cast Magnesium Alloy, Edition 1, pp. 177, 179, Jan. 2006 with partial English-language translation.
G. Schichtel, Magnesium-Taschenbuch. Berlin: VEB Verlag Technik, 1954, S. 432.
Friedrich et al., Magnesium Technology—Metallurgy, Design Data, Applications. Berlin, Heidelberg: Springer-Verlag, 2006, S. 80-83, 94-95, 633-636.
Oct. 29, 2014 Office Action issued in German Application No. 112010002575.4 (Including English Translation).
Apr. 14, 2015 Office Action issued in Chinese Application No. 201080028398.X.
Nov. 15, 2014 Office Action issued in Chinese Application No. 201080028398.X (with English translation).

RECYCLED MAGNESIUM ALLOY, PROCESS FOR PRODUCING THE SAME, AND MAGNESIUM ALLOY

TECHNICAL FIELD

The present invention relates to a recycled magnesium alloy and a process for producing the same, and a magnesium alloy.

BACKGROUND ART

Magnesium (Mg) is the lightest of the practical metals and has a good specific strength, and its resources are abundant. Now that weight saving and reduction of environmental burdens are strongly demanded, magnesium is a promising metal material and magnesium alloys are becoming to be used in various products in various fields.

Magnesium, however, is a very active metal and has the lowest potential (i.e., the highest ionization tendency) among the practical metals. Since magnesium does not form a corrosion resistant film on itself, magnesium-based members are susceptible to corrosion. Therefore, acquisition of corrosion resistance is essential to widespread utilization of the magnesium-based members. One possible means for the acquisition is to provide a corrosion resistant film on a surface of the magnesium-based members. However, formation of a corrosion resistant film incurs high costs. Moreover, even if a corrosion resistant film is formed, corrosion may proceed from defect portions or damaged portions of the film.

Therefore, there is a need for magnesium alloys having good corrosion resistance in themselves. The root cause of corrosion of magnesium alloys is the presence of impurity elements (corrosion-causing elements) such as copper (Cu), iron (Fe) and nickel (Ni). Accordingly, conventional magnesium alloys ensure corrosion resistance by strictly limiting the amount of these corrosion-causing elements mixed in the alloys. For example, a known alloy AZ91D according to ASTM standards ensures good corrosion resistance by strictly limiting the content of corrosion-causing impurities to less than 0.03 mass % (300 ppm) of Cu, less than 0.0015 mass % (15 ppm) of Ni, and less than 0.005 mass % (50 ppm) of Fe. Such a magnesium alloy needs to be produced under strictly controlled conditions and production of brand-new products is taken for granted. This not only incurs an increase in production costs but also inhibits recyclability of magnesium-based members, and does not meet current demand for effective utilization of resources and reduction of environmental burdens.

CITATION LIST

Patent Literature

PTL 1: Japanese translation of PCT international application publication No. 2009-501,845 T (PCT International Publication No. WO2007/009,435) (U.S. Patent Application Publication No. 2009/104,070 A1)
PTL 2: Japanese Unexamined Patent Publication No. H03-97,824 (U.S. Pat. No. 5,073,207)

SUMMARY OF INVENTION

Technical Problem (1) Under these circumstances, Patent Document 1 proposed a magnesium alloy, especially a magnesium alloy recycled from scraps (a secondary alloy), having a good corrosion resistance in spite of relatively large content of corrosion-causing elements such as Cu. Specifically, this document proposed a magnesium alloy comprising, by mass (hereinafter % by mass will be sometimes simply referred to as %), aluminum (Al): 10 to 20%, zinc (Zn): 2.5 to 10% and manganese (Mn): 0.1 to 2% and permitting Cu: 0.3 to 2% or Ni: 0.001 to 2%. Therefore, why this magnesium alloy has a good corrosion resistance is not fully clarified, but according to the description of Patent Document 1, it seems that local corrosive action caused by corrosion-causing elements such as Cu is suppressed by making the magnesium alloy contain a relatively large amount of Al and stably forming a beta phase having a network structure.

(2) Also there is a magnesium alloy AZ92 according to ASTM standards which is defined to comprise Al: 8.3 to 9.7%, Zn: 1.6 to 2.4%, Mn: 0.1 to 0.35%, Cu: less than 0.35%, Ni: less than 0.01%, and Fe: less than 0.02%. This magnesium alloy is not practically used at present and little is known about its corrosion resistance. The standard specification of this AZ92 alloy takes production of brand-new products (a primary alloy) for granted and does not intend recycling of magnesium alloys. Besides, as long as the present inventors know, no reports on recycling of this alloy have been made.

Patent Document 2 describes a magnesium alloy having a similar composition in terms of Al, Zn and Mn, but does not have any reference to recycling of magnesium alloys. Besides, as is apparent from the description that this alloy contains Ca, which causes corrosion, in an amount of 0.5 to 5 mass %, Patent Document 2 has no description of corrosion resistance or the like of this magnesium alloy. Moreover, this magnesium alloy is not a cast material but a plastically worked material comprising atomized powder.

(3) The present invention has been made in view of these circumstances. It is an object of the present invention to provide a process for producing a recycled magnesium alloy which enables recycling of magnesium alloys and obtaining a magnesium alloy having a good corrosion resistance, and to provide such a recycled magnesium alloy having a good corrosion resistance. It is another object of the present invention to provide a magnesium alloy which exhibits a good corrosion resistance in itself without any special anti-corrosion treatment and is suitable for future recycling.

Solution to Problem

The present inventors have earnestly studied to solve these problems and, as a result of trial and error, succeeded in obtaining a recycled magnesium alloy which can remarkably increase the permissible amount of Cu, which is a corrosion-causing element, in comparison with those of the conventional alloys and at the same time assure practical level of corrosion resistance, by increasing Zn content of the magnesium alloy while suppressing Al content. Then the present inventors have further extended this finding and completed the following aspects of the present invention.

<<Process for Producing a Recycled Magnesium Alloy>>

(1) A process for producing a recycled magnesium alloy of the present invention comprises: a melting step of heating and melting a collected raw material comprising a collected magnesium alloy member, thereby obtaining raw material molten metal; an adjusting step of adjusting composition of the raw material molten metal in accordance with Cu content of the raw material molten metal, thereby obtaining adjusted molten metal comprising, by mass:

Al: 5 to 10%,
Zn: not less than 1% and not less than three times of the Cu content (%),
Mn: 0.1 to 1.5%, and
the remainder: Mg and impurities with or without one or more reforming elements; and
a solidifying step of cooling and solidifying the adjusted molten metal, thereby obtaining a recycled magnesium alloy.

<<Recycled Magnesium Alloy>>

(1) The present invention can be grasped not only as the abovementioned process for producing a recycled magnesium alloy but also as a recycled magnesium alloy obtained by the process. That is to say, the present invention can be a recycled magnesium alloy obtained by melting and solidifying a collected raw material comprising a collected magnesium alloy member, and produced by the above-mentioned production process.

(2) Furthermore, the present invention can also be grasped as the following recycled magnesium alloy regardless of its production process. That is to say, the present invention can be a recycled magnesium alloy obtained by melting and solidifying a collected raw material comprising a collected magnesium alloy member and comprising, by mass:

Al: 5 to 10%,
Zn: 2.4 to 6%,
Mn: 0.1 to 1.5%,
Cu: not more than one third of the Zn content (%), and
the remainder: Mg and impurities with or without one or more reforming elements.

(3) The abovementioned recycled magnesium alloy may comprise, by mass:

Al: 5 to 10%,
Zn: 1 to 2.4%,
Mn: 0.1 to 1.5%,
R.E. (rare earth element(s)): 0.1 to 1.5%,
Cu: not more than one third of the Zn content (%), and
the remainder: Mg and impurities with or without one or more reforming elements.

(4) Moreover, the abovementioned recycled magnesium alloy may comprise, by mass:

Al: 5 to 10%,
Zn: 1 to 6%,
Mn: 0.1 to 1.5%,
R.E.: 0.1 to 1.5%,
Cu: not more than one third of the Zn content (%), and
the remainder: Mg and impurities with or without one or more reforming elements.

<<Magnesium Alloy>>

By the way, the present invention can be grasped not only as a recycled magnesium alloy or a process for producing the same but also a brand-new magnesium alloy (a primary alloy) which can be easily recycled in future.

(1) That is to say, the present invention can be a magnesium alloy comprising, by mass:

Al: 5 to 10%,
Zn: 1 to 6%,
Mn: 0.1 to 1.5%, and
the remainder: Mg and impurities with or without one or more reforming elements.

(2) The abovementioned magnesium alloy of the present invention may further contain 0.1 to 1.5% of R.E.

(3) Moreover, the Zn content of the magnesium alloy of the present invention containing 0.1 to 1.5% of R.E. may be 1 to 2.4%.

<<How this Invention has been Made and Mechanism of this Invention>>

(1) The present invention pays special attention to Cu among corrosion-causing elements of magnesium alloys. This is because, when recycling of magnesium alloys is considered, Cu is an element which is very easily mixed in the alloys but no effective method for removing Cu is available at present. One of the reasons why Cu is easily mixed in recycling magnesium alloys is that Cu is heavily used in members of aluminum alloys, iron-based sintered bodies and so on and electrically conductive materials.

Fe, which is one of the main corrosion-causing elements other than Cu, can be removed by sedimentation from molten metal of magnesium alloys by using Mn. Therefore, reduction of Fe content is relatively easy. On the other hand, Ni, which is also a corrosion-causing element, is hardly solid soluble in magnesium alloys, so it is unlikely that Ni content of magnesium alloys will rapidly increase.

These circumstances are true not only with a recycled magnesium alloy or a process for producing the same but also with a magnesium alloy. Therefore, for the purpose of convenience, "a magnesium alloy" will be discussed below, but the following discussion also applies to a recycled magnesium alloy and a process for producing the same.

(2) The mechanism how the magnesium alloy of the present invention exhibits a good corrosion resistance is not fully clarified but at present it is believed as follows: Conventionally it has been believed that corrosion of Al-containing magnesium alloys (Mg—Al based alloys) proceeds because an Mg—Al—Cu compound (precisely speaking, an "$Mg_6Al_7Cu_3$" compound) and alpha-Mg phase form local cells (precisely speaking, the $Mg_6Al_7Cu_3$ compound serves as a cathode). The present inventors have earnestly studied about the Mg—Al—Cu compound on the basis of the AZ91 alloy, which contains about 0.7% of Zn, and as a result, have newly found that the Mg—Al—Cu compound is an $Mg_6Al_7Cu_3$ compound containing a slight amount of Zn.

The present inventors have conducted more research on the basis of this finding and reached the idea that corrosion caused by this compound may be suppressed by changing the $Mg_6Al_7Cu_3$ compound, which is a cause of corrosion. Then, when the present inventors have actually increased Zn content of magnesium alloys, it has been found that corrosion resistance of the magnesium alloys improves. Specifically speaking, it has become apparent that by increasing Zn content, corrosion resistance of magnesium alloys can be maintained regardless of variation in Cu content. That is to say, even if Cu is mixed in magnesium alloys, owing to the presence of Zn, the $Mg_6Al_7Cu_3$ compound, which becomes starting points of corrosion, is not formed and instead an "$Mg_{32}(Al, Zn, Cu)_{49}$" compound is formed. It is believed that this change from the $Mg_6Al_7Cu_3$ compound to the "$Mg_{32}(Al, Zn, Cu)_{49}$" compound appears as an improvement in corrosion resistance and corrosion resistance deterioration caused by Cu is suppressed.

It has also been found out that as Zn content increases, the change in corrosion rate relative to an increase in Cu content becomes smaller. That is to say, it has been found out that corrosion rate susceptibility, which indicates the ratio of the amount of change in corrosion rate relative to the amount of change in Cu content, decreases together with an increase in Zn content. This means that owing to an increase in Zn content of the magnesium alloys, corrosion rate does not change much even if Cu content changes to some extent, and stable corrosion resistance is obtained.

However, if the overall Cu content is excessively large, Cu content of the above-mentioned Mg—Al—Cu—Zn compound also increases. In this case, even in the presence of a sufficient amount of Zn, the Mg—Al—Cu—Zn compound may become new starting points of corrosion, and corrosion resistance of the magnesium alloys may be degraded. The present inventors have earnestly studied about this and found that when Cu content is not more than 0.5%, not more than 0.4%, or not more than 0.3%, a (recycled) magnesium alloy exhibits stable corrosion resistance.

Therefore, the present invention can assure corrosion resistance of even a recycled magnesium alloy whose Cu content easily changes, not to mention that of a brand-new magnesium alloy, and thus recyclability of magnesium alloys can be improved.

(3) Further earnest research of the present inventors has clarified that the above-mentioned excellent effect of Zn decreases when Al is contained in an excessive amount. This is believed to be because Zn is absorbed, in the form of solid solution or the like, by the beta phase of the magnesium alloy (an $Mg_{17}Al_{12}$ compound), which increases together with Al, and the composition of the Mg—Al—Cu—Zn compound, which is a cause of corrosion, becomes difficult to be changed into a corrosion resistant composition.

<<Remarks>>

(1) When the term "recycling" is used in this specification, how many times it is recycled is not considered. In addition, "a recycled magnesium alloy" or "a magnesium alloy" mentioned in this specification can be not only a bulk material such as an ingot but also a raw material having the shape of a rod, a tube, a plate or the like, a cast material such as a die cast material, a forged material, a cut material or the like. In these cases, "a magnesium alloy" can be restated as "a magnesium alloy member".

"Corrosion resistance" mentioned in this specification uses corrosion rate, corrosion rate susceptibility and the like as indices. "Corrosion rate" is corrosion weight loss per unit time (day). "Corrosion rate susceptibility" mentioned in this specification is the ratio of the amount of change in corrosion rate relative to the amount of change in Cu content (the rate of change of corrosion rate relative to Cu content). Although specific ranges of these indices are different in accordance with desired characteristics, preferred corrosion rate (MCD) is not more than 1, not more than 0.8, not more than 0.7, not more than 0.6, not more than 0.5, not more than 0.4, not more than 0.3, or not more than 0.2. Preferred corrosion rate susceptibility (CS) is not more than 400, not more than 350, not more than 300, not more than 200, not more than 100, not more than 80, not more than 50, or not more than 40. It should be noted that the unit of each value of corrosion rate shown here is $mg/cm^{-2}/day^{-1}$. In addition, because in calculating corrosion rate susceptibility, Cu content is regarded as dimensionless number (for example, Cu content of 1 mass % is regarded as 0.01), the unit of each value of corrosion rate susceptibility is also $mg/cm^{-2}/day^{-1}$.

Since corrosion rate susceptibility (CS) is the rate of change of corrosion rate (MCD) relative to Cu content, corrosion rate susceptibility of an Mg alloy having a certain composition is obtained from the slope of a dispersion diagram made by plotting corrosion rate on the axis of ordinates relative to Cu content on the axis of abscissas. Generally speaking, when the Cu content exceeds 0.5%, corrosion is severer and the change in corrosion rate tends to be excessively great. On the other hand, when the Cu content is less than 0.1%, corrosion is mild and the change in corrosion rate tends to be excessively small. States of such local areas vary widely and this is not preferable in view of appropriately evaluating corrosion rate susceptibility. Therefore, in this specification, practical corrosion rate susceptibility (CS) was calculated from the slope of the abovementioned dispersion diagram within the Cu content range of 0.1 to 0.5%.

(2) A range "x to y" mentioned in this specification includes both the lower limit value "x" and the upper limit value "y", unless otherwise specified. Moreover, the lower limit values and the upper limit values mentioned in this specification can be arbitrarily combined to form a new range "a to b".

Chemical composition of molten metals and alloys can be identified by analyzing samples by the Quantolet spectrometric method, XRF, ICP or the like. Chemical composition of various molten metals and alloys in this specification should be regarded as identified by the Quantolet method unless otherwise specified.

Advantageous Effects of Invention

The collected raw material includes not only at least one pure magnesium alloy member but also a wide variety of members and impurities attached to the alloy member. Recycled magnesium alloys obtained by using this kind of collected raw material generally contain a large amount of Cu, which is difficult to be removed and is a main cause of corrosion. Therefore, recycled magnesium alloys are generally poor in corrosion resistance.

The present invention, however, makes it possible to effectively suppress corrosion caused by Cu by making a recycled magnesium alloy contain a relatively large amount of Zn as mentioned above. Namely, the production process of the present invention enables to obtain a recycled magnesium alloy having a good corrosion resistance regardless of relatively large content of Cu. In other words, the production process of the present invention makes it possible to greatly increase the permissible amount of Cu, which is difficult to be removed and is a corrosion-causing element, and ensure practical level of corrosion resistance of a recycled magnesium alloy.

This increase in the permissible amount of Cu enables not only an improvement in corrosion resistance but also drastic reduction of production costs of a (recycled) magnesium alloy such as raw material costs and management costs.

DESCRIPTION OF EMBODIMENTS

The present invention will be described in more detail by way of embodiments of the invention. Description in this specification including that of the following embodiments can be appropriately applied not only to magnesium alloys but also recycled magnesium alloys and their production processes of the present invention. The present invention can be formed by adding one or more selected arbitrarily from the constituent features described below to the aforementioned constitution of the present invention. Any of the following constitutional features can be selected in a multiple form beyond categories. For example, a constituent feature about one compositional range is relevant not only to a product but also to a production process. A constitutional feature about a production process can be regarded as that of a (recycled) magnesium alloy when it is understood as a product by process. It should be noted that which embodiment is best varies with target application, required characteristics or the like.

<<Recycled Magnesium Alloy/Magnesium Alloys>>
<Composition>

A recycled magnesium alloy or a magnesium alloy of the present invention (hereinafter, simply referred to as a "magnesium alloy") basically comprises Zn, Al, Mn, with Mg being the remainder, and it is more preferable that the magnesium alloy further contains R.E. Hereinafter, these main constituent elements will be discussed.

(1) Zn

As mentioned above, Zn is an element improving corrosion resistance of the magnesium alloy of the present invention. Especially, Zn suppresses corrosion caused by Cu, which is a corrosion-causing element, and increases the permissible amount of Cu.

By the way, in a case of conventional magnesium alloys, it has been said that Zn content effective to improve corrosion resistance is 1% at most. In contrast, in the magnesium alloy of the present invention, the lower limit of Zn content is defined as 1%. On the other hand, in the magnesium alloy of the present invention, there is no upper limit of Zn content from the viewpoint of corrosion resistance. However, it is preferable to define the upper limit of Zn content as 6% in order to ensure mechanical characteristics such as elongation of the magnesium alloy. Namely, it is preferable that the magnesium alloy of the present invention contains 1 to 6% of Zn.

An upper limit value or a lower limit value of Zn can be arbitrarily determined within this range. It is particularly preferable that the lower limit value is any of 1.5%, 2%, 2.4%, 2.5% and 3%. It is particularly preferable that the upper limit value is any of 5.5%, 5%, 4.5% and 4%. When the magnesium alloy of the present invention contains R.E., corrosion resistance of the magnesium alloy improves further as mentioned below. The reason or mechanism is not fully clarified, but it is believed that R.E. not only suppresses corrosion caused by Ni, which is a corrosion-causing element, but also can further improve corrosion resistance of the magnesium alloy in cooperation with Zn. Therefore, it is preferable to make the lower limit of Zn content relatively low when the magnesium alloy of the present invention contains R.E., and make the lower limit of Zn content relatively high when the magnesium alloy does not contain R.E. Specifically speaking, when the magnesium alloy does not contain R.E., it is preferable to make the lower limit of Zn content not less than 2.4%. On the other hand, when the magnesium alloy contains R.E., making the lower limit of Zn content not less than 1% allows the magnesium alloy of the present invention to exhibit a sufficient corrosion resistance. In this case, if Zn is contained in a range of 1 to 2.4%, the magnesium alloy can efficiently obtain corrosion resistance.

(2) Al

Al is an element improving mechanical characteristics such as strength of magnesium alloys and also an element effective in improving corrosion resistance of the magnesium alloys. An excessively small Al content is not preferable because these effects cannot be obtained. On the other hand, an excessively large Al content is not preferable, either, because elongation of the magnesium alloys decreases. In addition, the excessively large Al content may inhibit the abovementioned effect of Zn to improve corrosion resistance. Therefore, in the present invention, it is preferable to contain Al in a range of 5 to 10%. An upper limit value or a lower limit value of Al can be arbitrarily determined within this range. Preferably the lower limit value is any of 6%, 7%, 8%, and 8.5%. On the other hand, preferably the upper limit value is 9.5%.

(3) R.E.

R.E. (rare earth element(s)) is one or more elements which can improve corrosion resistance of magnesium alloys in cooperation with the abovementioned Zn. R.E. is also one or more elements effective in suppressing corrosion caused by Ni. It is not preferable to contain R.E. in an excessively small amount, because these effects are not exhibited much. On the other hand, it is not preferable to contain expensive R.E. in an excessively large amount, because raw material costs of magnesium alloys increase. Therefore, in the present invention, it is preferable to contain R.E. in a range of 0.1 to 1.5%. An upper limit value or a lower limit value of R.E. can be determined arbitrarily within this range. It is particularly preferable that the lower limit value is any of 0.2%, 0.3%, 0.4%, and 0.5%. On the other hand, it is particularly preferable that the upper limit value is any of 1.3%, 1% and 0.8%.

By the way, R.E. includes a number of elements. R.E. mentioned in the present invention is not limited to one or more particular elements, but especially cerium (Ce), lanthanum (La) and so on are effective in improving corrosion resistance of magnesium alloys. However, generally R.E. is supplied as mischmetal (Mm), which is an alloy of a plurality of rare earth elements, in consideration of raw material costs and availability. Therefore it is reasonable to consider Mm content as R.E. content. One exemplary composition of Mm comprises, by mass, Ce: 52%, La: 25%, Nd: 16%, and Pr: 5%.

(4) Mn

Mn is an element effective in removing Fe, which is a corrosion-causing element, from molten metal of magnesium alloys and suppressing corrosion caused by Fe. When the content of Mn remaining in magnesium alloys is excessively small, these effects cannot be obtained. On the other hand, when the Mn content is excessively large, costs of magnesium alloys increase and it is uneconomical. Therefore, Mn content of the magnesium alloy of the present invention is defined as 0.1 to 1.5%. An upper limit value or a lower limit value of the Mn content can be arbitrarily determined within this range. It is especially preferable that the lower limit value is either 0.2% or 0.3%. It is especially preferable that the upper limit value is any of 1.2%, 1%, 0.8%, and 0.6%.

It should be noted that when the magnesium alloy of the present invention contains R.E., Mn can remove Fe or suppress corrosion caused by Fe in cooperation with R.E.

(5) Reforming Element

A "reforming element" mentioned in this specification is an element effective in improving characteristics of magnesium alloys, other than Mg, Al, Mn, Zn, R.E and corrosion-causing elements such as Cu, Ni and Fe. Characteristics to be improved are not limited in kind and are, for example, corrosion resistance, strength, elongation, toughness and flame retardancy. Examples of the reforming element include silicon (Si): 0.2 to 2%, calcium (Ca): 0.2 to 1.5%, and beryllium (Be): 0.0001 to 0.005%. Furthermore, the reforming element can be one or more of tin (Sn), yttrium (Y), strontium (St), bismuth (Bi) and zirconium (Zr). These reforming elements can be contained singly or in any combination. The content of these reforming elements is not limited to the exemplary ranges, and generally the content is very small.

(6) Impurities

Impurities mentioned in this specification are elements which are not necessary to improve characteristics of magnesium alloys, and include not only elements which degrade the characteristics but also elements which do not degrade the characteristics. Typical examples of impurities are Cu, Ni and Fe, which are corrosion-causing elements. In addition to these, there are impurities contained in raw material powder and those mixed in respective steps of production processes. Elements which cannot be removed for costs or technical reasons are especially called "inevitable impurities".

By the way, as Cu, which is a corrosion-causing element, is mixed in magnesium alloys in a smaller amount, it is more preferable. However, in the magnesium alloy of the present invention, the upper limit value of the permissible Cu content can be increased to about 0.1%, 0.3%, 0.4% or 0.5%. These values are remarkably high when compared to Cu content of less than 0.03% of the conventional AZ91D alloy.

As Ni, which is also a corrosion-causing element, is mixed in magnesium alloys in a smaller amount, it is more preferable. However, in the magnesium alloy of the present invention, the permissible Ni content is greatly increased when compared to Ni content of less than 0.0015% of the conventional AZ91D alloy. For example, in the present invention, the upper limit value of Ni content can be increased to about 0.002%, 0.005%, 0.01%, or 0.05%. Accordingly, since in the present invention, the permissible Cu content and the permissible Ni content can be increased to not more than 0.5% and not more than 0.05%, respectively, recycling of magnesium alloys becomes easy and corrosion resistance of recycled magnesium alloys can be ensured.

<<Process for Producing a Recycled Magnesium Alloy>>

A process for producing a recycled magnesium alloy of the present invention basically comprises a melting step, an adjusting step and a solidifying step.

(1) Melting Step

The melting step is a step of heating and melting a collected raw material comprising a collected magnesium alloy member, thereby obtaining a raw material molten metal.

The "magnesium alloy member" mentioned here means at least one member comprising magnesium or a magnesium alloy. This member can have any shape, form or history. For example, the magnesium alloy member can be a product, an ingot, or a scrape. Besides, the magnesium alloy member can be a used item or an unused item. The "collected raw material" can comprise not only a magnesium alloy member alone but also a magnesium alloy member mixed with other metal members. Needless to say, it is more preferable that the collected raw material comprises only a magnesium alloy member of a composition similar to a desired composition of a recycled magnesium alloy to be obtained.

(2) Adjusting Step

The adjusting step is a step of obtaining adjusted molten metal by adjusting composition of the raw material molten metal in a certain compositional range in accordance with Cu content of the raw material molten metal. The compositional range to be obtained has been already discussed but additional discussion will be made here about Zn and R.E.

In the production process of the present invention, Zn content of the adjusted molten metal is defined not only as not less than 1% but also as not less than three times of Cu content in accordance with the Cu content of the raw material molten metal. This can ensure corrosion resistance of a recycled magnesium alloy obtained by the production process of the present invention. Preferably the Zn content is not less than 3.5 times, not less than 4 times, not less than 4.5 times, not less than 5 times, not less than 7 times, or not less than 10 times of the Cu content. As mentioned before, it is efficient to make Zn content of the adjusted molten metal not more than 6%.

When the adjusted molten metal contains substantially no R.E., it is efficient to make Zn content of the adjusted molten metal not less than 2.4%. On the other hand, when the adjusted molten metal contains 0.1 to 1.5% of R.E., it is efficient to make Zn content of the adjusted molten metal not more than 2.4%. Of course, when the adjusted molten metal contains R.E., making Zn content not less than 2.4% can further improve corrosion resistance.

Moreover, when Ni, which is a corrosion-causing element, is mixed in the raw material molten metal (for example, when Ni content is not less than 0.001%), making the adjusted molten metal contain R.E. enables to obtain a recycled magnesium alloy having a good corrosion resistance.

In order to obtain a recycled magnesium alloy having a stable corrosion resistance, it is preferable to make Cu content and Ni content of the adjusted molten metal not more than 0.5% and not more than 0.005%, respectively.

(3) Solidifying Step

The solidifying step is a step of cooling and solidifying the adjusted molten metal, thereby obtaining a recycled magnesium alloy. This step is a step of solidifying, by natural or forcible cooling, molten metal which has been introduced into a mold (e.g., a metal mold and a sand mold) for gravity casting, metal mold casting, die casting and so on.

If there are a lot of compositionally segregated portions or portions having coarse crystal grain, corrosion may proceed from starting points of these portions and corrosion resistance of magnesium alloys may be degraded. It is preferable to employ a die casting step as the solidifying step, because such segregation in the metal structure is small. It is also possible to equalize the metal structure or composition by applying appropriate thermal treatment to a magnesium alloy member obtained after the solidifying step.

<<Applications of Magnesium Alloy>>

Because of its good corrosion resistance, the magnesium alloy of the present invention can be used in a variety of products, such as structural members, casing members, wheels, and other automotive components. Since the magnesium alloy of the present invention has a good corrosion resistance in itself, anti-corrosion treatment can be omitted depending on portions to be used, and costs of the magnesium alloy member can be reduced.

EXAMPLES

The present invention will be described more concretely by way of examples.

<Production of Specimens>

Specimens having chemical composition shown in Tables 1 to 7 were prepared by using various commercially available raw materials. R.E. used was commercially available Mm (Ce: 52%, La: 25%, Nd: 16%, and Pr: 5%).

Specifically, first, a commercially available raw material comprising pure metal was introduced into a crucible formed of a high-Cr alloy steel (JIS SUS430) and having an inner diameter of 80 mm and a height of 230 mm, and melted by an electric furnace, thereby obtaining molten metal (raw material molten metal) (melting step). Chemical composition of this molten metal was adjusted to respective compositions shown in Tables 1 to 7, and held at 750 deg. C. (adjusting step). The thus obtained molten metal (the adjusted molten metal) was filled in a cavity of a metal mold and rapidly cooled and solidified, thereby obtaining specimens comprising die castings having various chemical compositions shown in Tables 1 to 7 (solidifying step). These die cast specimens had a plate shape of 40×150×3 mm. This die casting was conducted by using a 50-tonn die cast machine under casting conditions of injection speed: 0.4 m/s, injection pressure: 64 MPa and molten metal temperature: 650 deg. C.

<Corrosion Test>

(1) Corrosion test according to JIS H 0541 was carried out by using plate-shaped test pieces (25×25×2 mm) cut out from the abovementioned specimens. Specifically, the respective test pieces were immersed in an aqueous 5% NaCl solution for 100 hours and bubbles (hydrogen gas) generated there were collected and corrosion weight loss of the respective test pieces was calculated from the amount of the generated bubbles. Corrosion rate was obtained from the thus calculated corrosion weight loss of the respective test pieces. In this specification, corrosion rate (MCD) is expressed as corrosion weight loss per day (mg/cm$^{-2}$/day$^{-1}$).

Furthermore, from a correlation diagram (a dispersion diagram) constructed by plotting corrosion rate against Cu content (Cu concentration: mass %) of the specimens which were different from each other only in Cu content, the rate of change of corrosion rate relative to Cu content (the slope of the correlation diagram) was obtained.

Since this rate of change indicates susceptibility of corrosion rate to Cu content, this rate of change is called corrosion rate susceptibility (CS: mg/cm$^{-2}$/day$^{-1}$) in this specification and calculated by the abovementioned method. It should be noted that, although arbitrarily omitted in this specification, the unit of corrosion rate or corrosion rate susceptibility is mg/cm$^{-2}$/day$^{-1}$ unless otherwise specified.

(2) The thus obtained measurement or calculation results of the various specimens are shown together in Tables 1 to 5. It should be noted that the following marks indicating evaluation results based on corrosion rate (MCD) and corrosion rate susceptibility (CS) are shown in the columns of corrosion resistance.

MCD<0.4 and CS≤400 ⇒ ⊚

0.4≤MCD≤1 and CS≤400 ⇒ ○

1<MCD or 400<CS ⇒ x

The reason why corrosion rate (MCD) and corrosion rate susceptibility (CS) are employed here as evaluation criteria is as follows. First, under environment where a product is practically used, corrosion resistance of the product is evaluated by corrosion weight loss in a certain period. Therefore, corrosion rate is employed as an evaluation criterion for corrosion resistance. Next, when Cu content changes in recycling magnesium alloys, corrosion resistance of a recycled magnesium alloy also changes, which results in variation in quality. Therefore, corrosion rate susceptibility is employed as an evaluation criterion as an index of the ratio of the amount of change in corrosion resistance relative to the amount of change in Cu content.

<Evaluation>

(1) Effect of Zn

Figure 1:
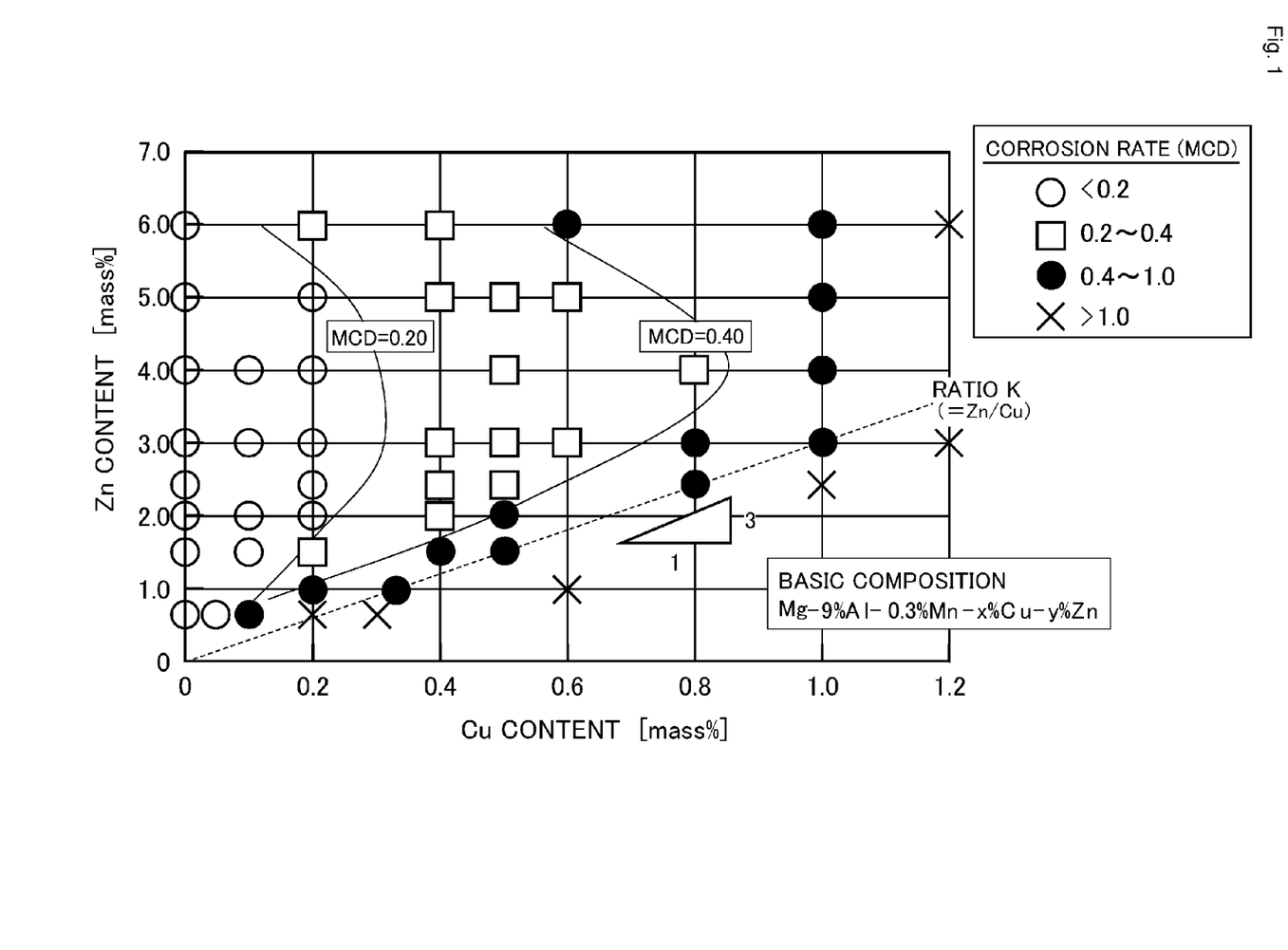
FIG. 1 is a correlation diagram of chemical composition (Cu and Zn) and corrosion rate of magnesium alloys.

Corrosion resistance of the respective specimens in which Zn content and Cu content were variously changed is shown in Tables 1 to 3. A diagram obtained by plotting Zn content of these specimens on the axis of ordinates against Cu content of these specimens on the axis of abscissas is shown in FIG. 1. It should be noted that the shape of the plot marks was changed by values of corrosion rate (MCD).

It is apparent from Tables 1 to 3 and FIG. 1 that when the content of Cu, which is a corrosion-causing element, is the same, as Zn content is larger, corrosion rate generally decreases and corrosion resistance improves. Moreover, as the Zn content is larger, contour interval of corrosion rate tends to be wider and improvement in corrosion resistance of magnesium alloys relative to an increase in Cu content tends to be greater. That is to say, corrosion rate susceptibility, which is the ratio of the amount of change in corrosion rate relative to the amount of change in Cu content, is rapidly reduced with an increase in Zn content and corrosion progress relative to an increase in Cu content becomes slower.

This tendency is remarkable in a region where Zn content is not less than 1%, not less than 2% or not less than 2.4%. However, when the Zn content is not less than 5%, corrosion rate does not decrease much regardless of an increase in Zn content. Therefore, it can be said that a preferred upper limit of Zn content in efficiently improving corrosion resistance of magnesium alloys is 5% or 4.5%. It is also apparent from FIG. 1 that in a region where a ratio K of Zn content to Cu content is not less than 3, corrosion rate is generally small.

If the Zn content is the same, as the content of Cu, which is a corrosion-causing element, is smaller, corrosion resistance of magnesium alloys is higher. Therefore it is also apparent that a preferred upper limit of Cu content is 1.2%, 1%, 0.8%, 0.6%, 0.5%, or 0.4%.

(2) Effect of R.E.

The specimens in which Zn content and Cu content were variously changed were examined about effect of R.E. content on corrosion resistance and the results are shown in Tables 4 to 6. It is apparent from the results shown in Tables 4 to 6 that, if chemical composition other than R.E. is the same, as magnesium alloys contain a larger amount of R.E., corrosion rate decreases and corrosion resistance of the magnesium alloys improves.

When the magnesium alloys having the same chemical composition except R.E. are compared with each other among the specimens shown in Tables 1 to 3 and Tables 4 to 6, it is understood that the magnesium alloys containing R.E. have lower corrosion rates than those containing no R.E. and are improved in corrosion resistance. This means that R.E. does not inhibit the abovementioned corrosion suppression effect of Zn and rather improves corrosion resistance of magnesium alloys. It is believed that, especially when magnesium alloys contain Ni, R.E. is effective in improving their corrosion resistance. This tendency is remarkable when R.E. content is in a range of 0.1 to 1.5% or 0.2 to 1.0%.

(3) Effect of Al

The respective specimens shown in Table 7 were examined about effect of Al content on corrosion rate. The results shown in Table 7 indicate that in both cases when Al content is excessively small and excessively large, corrosion rate increases and corrosion resistance of magnesium alloys is degraded. Especially as the Al content increases, corrosion rate tends to increase and corrosion resistance of magnesium alloys tends to be degraded. This is believed to be because, owing to an increase in Al content, beta phase, which forms a solid solution with Zn, increases in magnesium alloys, and as a result formation of the corrosion resistant relatively stable Mg—Al—Cu—Zn compound is inhibited. Therefore, in order to suppress corrosion caused by Cu reliably by Zn, it is preferable to make Al content not more than 10.5% or not more than 10%.

(4) Relation between Cu Content and Minimum Corrosion Rate

Figure 2:
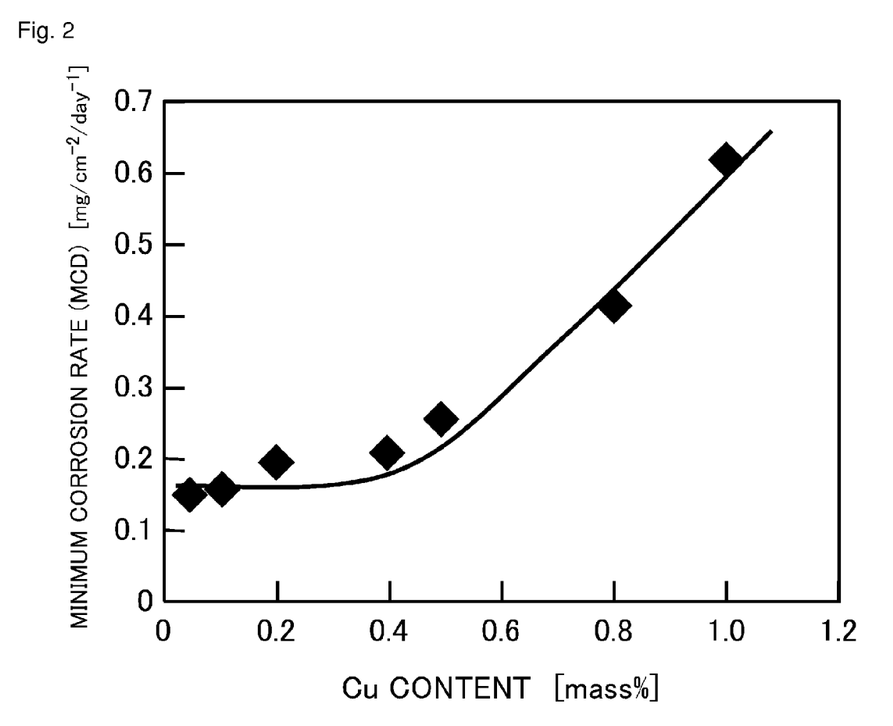
FIG. 2 is a dispersion diagram showing the relation between Cu content and minimum corrosion rate of magnesium alloys.

The relation between Cu content and corrosion rate of magnesium alloys having a certain composition (Mg-9% Al-0.3% Mn-x % Cu-y % Zn) is shown in FIG. 2, based on the results shown in Tables 1 to 3. As apparent also from FIG. 1, corrosion rate of magnesium alloys are affected by Cu content and Zn content. Therefore, in FIG. 2, the minimum of the corrosion rates obtained by variously changing the Zn content (the minimum corrosion rate obtained by optimizing the Zn content) under a certain Cu content is shown on the axis of ordinates.

It is understood from FIG. 2 that when Cu content exceeds 0.5%, the minimum corrosion rate tends to increase with an increase in Cu content regardless of optimization of Zn content. On the other hand, when Cu content is not more than 0.5% or not more than 0.4%, the minimum corrosion rate no longer makes much change and gets close to the corrosion rate (about 0.2 mg/cm$^{-2}$/day$^{-1}$) obtained when Cu content is almost zero. It is understood that even if Cu content changes within a range of not more than 0.5% or not more than 0.4%, magnesium alloys exhibit stable corrosion resistance.

Although the present invention has been described with reference to preferred embodiments, those skilled in the art will recognize that changes may be made in form and detail without departing from the spirit and scope of the invention.

TABLE 1

| SPECIMEN No. | COMPOSITION (mass %) | | | | | | | Zn/Cu | CORROSION RATE [mg/cm$^{-2}$/day$^{-1}$] | CORROSION RATE SUSCEPTIBILITY | CORROSION RESISTANCE |
|---|---|---|---|---|---|---|---|---|---|---|---|
| | Al | Mn | R.E. | Zn | Cu | Ni | Fe | | | | |
| A01 | 9.0 | 0.3 | 0 | 1.0 | 0.20 | <0.002 | <0.005 | 5.0 | 0.55 | 308 | ○ |
| A02 | | | | 1.0 | 0.33 | | | 3.0 | 0.95 | | ○ |
| A03 | | | | 1.5 | 0.00 | | | — | 0.08 | 158 | ◎ |
| A04 | | | | 1.5 | 0.10 | | | 15.0 | 0.20 | | ◎ |
| A05 | | | | 1.5 | 0.20 | | | 7.5 | 0.35 | | ◎ |
| A06 | | | | 1.5 | 0.40 | | | 3.8 | 0.65 | | ○ |
| A07 | | | | 1.5 | 0.50 | | | 3.0 | 0.84 | | ○ |
| A08 | | | | 2.0 | 0.00 | | | — | 0.05 | 72 | ◎ |
| A09 | | | | 2.0 | 0.10 | | | 20.0 | 0.17 | | ◎ |
| A10 | | | | 2.0 | 0.20 | | | 10.0 | 0.19 | | ◎ |
| A11 | | | | 2.0 | 0.40 | | | 5.0 | 0.33 | | ◎ |
| A12 | | | | 2.0 | 0.50 | | | 4.0 | 0.46 | | ○ |
| A13 | | | | 2.4 | 0.00 | | | — | 0.09 | 60 | ◎ |
| A14 | | | | 2.4 | 0.20 | | | 12.0 | 0.18 | | ◎ |
| A15 | | | | 2.4 | 0.40 | | | 6.0 | 0.24 | | ◎ |
| A16 | | | | 2.4 | 0.50 | | | 4.8 | 0.38 | | ◎ |
| A17 | | | | 2.4 | 0.80 | | | 3.0 | 0.91 | | ○ |
| A18 | | | | 3.0 | 0.00 | | | — | 0.08 | 35 | ◎ |
| A19 | | | | 3.0 | 0.10 | | | 30.0 | 0.13 | | ◎ |
| A20 | | | | 3.0 | 0.20 | | | 15.0 | 0.18 | | ◎ |
| A21 | | | | 3.0 | 0.40 | | | 7.5 | 0.21 | | ◎ |
| A22 | | | | 3.0 | 0.50 | | | 6.0 | 0.29 | | ◎ |
| A23 | | | | 3.0 | 0.60 | | | 5.0 | 0.34 | | ◎ |
| A24 | | | | 3.0 | 0.80 | | | 3.8 | 0.67 | | ○ |
| A25 | | | | 3.0 | 1.00 | | | 3.0 | 0.82 | | ○ |

TABLE 2

| SPECIMEN No. | COMPOSITION (mass %) | | | | | | | Zn/Cu | CORROSION RATE [mg/cm$^{-2}$/day$^{-1}$] | CORROTION RATE SUSCEPTIBILITY | CORROSION RESISTANCE |
|---|---|---|---|---|---|---|---|---|---|---|---|
| | Al | Mn | R.E. | Zn | Cu | Ni | Fe | | | | |
| A26 | 9.0 | 0.3 | 0 | 4.0 | 0.00 | <0.002 | <0.005 | — | 0.12 | 37 | ◎ |
| A27 | | | | 4.0 | 0.10 | | | 40.0 | 0.16 | | ◎ |
| A28 | | | | 4.0 | 0.20 | | | 20.0 | 0.19 | | ◎ |
| A29 | | | | 4.0 | 0.50 | | | 8.0 | 0.31 | | ◎ |
| A30 | | | | 4.0 | 0.80 | | | 5.0 | 0.40 | | ◎ |
| A31 | | | | 4.0 | 1.00 | | | 4.0 | 0.47 | | ○ |
| A32 | | | | 5.0 | 0.00 | | | — | 0.10 | 32 | ◎ |
| A33 | | | | 5.0 | 0.20 | | | 25.0 | 0.17 | | ◎ |
| A34 | | | | 5.0 | 0.40 | | | 12.5 | 0.23 | | ◎ |
| A35 | | | | 5.0 | 0.50 | | | 10.0 | 0.27 | | ◎ |
| A36 | | | | 5.0 | 0.60 | | | 8.3 | 0.30 | | ◎ |
| A37 | | | | 5.0 | 1.00 | | | 5.0 | 0.44 | | ○ |
| A38 | | | | 6.0 | 0.00 | | | — | 0.16 | 30 | ◎ |
| A39 | | | | 6.0 | 0.20 | | | 30.0 | 0.23 | | ◎ |
| A40 | | | | 6.0 | 0.40 | | | 15.0 | 0.29 | | ◎ |
| A41 | | | | 6.0 | 0.60 | | | 10.0 | 0.49 | | ○ |
| A42 | | | | 6.0 | 1.00 | | | 6.0 | 0.88 | | ○ |

TABLE 3

| SPECIMEN No. | COMPOSITION (mass %) | | | | | | | Zn/Cu | CORROSION RATE [mg/cm$^{-2}$/day$^{-1}$] | CORROSION RATE SUSCEPTIBILITY | CORROSION RESISTANCE |
|---|---|---|---|---|---|---|---|---|---|---|---|
| | Al | Mn | R.E. | Zn | Cu | Ni | Fe | | | | |
| B01 | 9.0 | 0.3 | 0 | 0.7 | 0.00 | <0.002 | <0.005 | — | 0.17 | 947 | x |
| B02 | | | | 0.7 | 0.05 | | | 14.0 | 0.16 | | x |
| B03 | | | | 0.7 | 0.10 | | | 7.0 | 0.53 | | x |
| B04 | | | | 0.7 | 0.20 | | | 3.5 | 1.43 | | x |
| B05 | | | | 0.7 | 0.30 | | | 2.3 | 2.42 | | x |
| B06 | | | | 1.0 | 0.60 | | | 1.7 | 1.75 | 308 | x |
| B07 | | | | 2.4 | 1.00 | | | 2.4 | 1.41 | 60 | x |
| B08 | | | | 3.0 | 1.20 | | | 2.5 | 1.40 | 35 | x |
| B09 | | | | 6.0 | 1.20 | | | 5.0 | 1.70 | 30 | x |

TABLE 4

| SPECIMEN No. | COMPOSITION (mass %) | | | | | | | Zn/Cu | CORROSION RATE [mg/cm$^{-2}$/day$^{-1}$] | CORROSION RATE SUSCEPTIBILITY | CORROSION RESISTANCE |
|---|---|---|---|---|---|---|---|---|---|---|---|
| | Al | Mn | R.E. | Zn | Cu | Ni | Fe | | | | |
| C01 | 9.0 | 0.3 | 0.1 | 1.0 | 0.33 | <0.002 | <0.005 | 3.0 | 0.95 | 308 | ○ |
| C02 | | | 0.2 | 1.0 | 0.33 | | | 3.0 | 0.92 | | ○ |
| C03 | | | 0.5 | 1.0 | 0.33 | | | 3.0 | 0.89 | | ○ |
| C04 | | | 1.0 | 1.0 | 0.33 | | | 3.0 | 0.87 | | ○ |
| C05 | | | 1.5 | 1.0 | 0.33 | | | 3.0 | 0.89 | | ○ |
| C06 | | | 0.1 | 1.5 | 0.20 | | | 7.5 | 0.34 | 158 | ◉ |
| C07 | | | 0.2 | 1.5 | 0.20 | | | 7.5 | 0.34 | | ◉ |
| C08 | | | 0.5 | 1.5 | 0.20 | | | 7.5 | 0.34 | | ◉ |
| C09 | | | 1.0 | 1.5 | 0.20 | | | 7.5 | 0.33 | | ◉ |
| C10 | | | 1.5 | 1.5 | 0.20 | | | 7.5 | 0.32 | | ◉ |
| C11 | | | 0.1 | 1.5 | 0.50 | | | 3.0 | 0.83 | 158 | ○ |
| C12 | | | 0.2 | 1.5 | 0.50 | | | 3.0 | 0.81 | | ○ |
| C13 | | | 0.5 | 1.5 | 0.50 | | | 3.0 | 0.81 | | ○ |
| C14 | | | 1.0 | 1.5 | 0.50 | | | 3.0 | 0.72 | | ○ |
| C15 | | | 1.5 | 1.5 | 0.50 | | | 3.0 | 0.68 | | ○ |
| C16 | | | 0.1 | 2.4 | 0.00 | | | — | 0.09 | 60 | ◉ |
| C17 | | | 0.2 | 2.4 | 0.00 | | | — | 0.09 | | ◉ |
| C18 | | | 0.5 | 2.4 | 0.00 | | | — | 0.09 | | ◉ |
| C19 | | | 1.0 | 2.4 | 0.00 | | | — | 0.08 | | ◉ |
| C20 | | | 1.5 | 2.4 | 0.00 | | | — | 0.08 | | ◉ |
| C21 | | | 0.1 | 2.4 | 0.50 | | | 4.8 | 0.38 | 60 | ◉ |
| C22 | | | 0.2 | 2.4 | 0.50 | | | 4.8 | 0.37 | | ◉ |
| C23 | | | 0.5 | 2.4 | 0.50 | | | 4.8 | 0.36 | | ◉ |
| C24 | | | 1.0 | 2.4 | 0.50 | | | 4.8 | 0.35 | | ◉ |
| C25 | | | 1.5 | 2.4 | 0.50 | | | 4.8 | 0.35 | | ◉ |

TABLE 5

| SPECIMEN No. | COMPOSITION (mass %) | | | | | | | Zn/Cu | CORROSION RATE [mg/cm$^{-2}$/day$^{-1}$] | CORROSION RATE SUSCEPTIBILITY | CORROSION RESISTANCE |
|---|---|---|---|---|---|---|---|---|---|---|---|
| | Al | Mn | R.E. | Zn | Cu | Ni | Fe | | | | |
| C26 | 9.0 | 0.3 | 0.1 | 2.4 | 0.80 | <0.002 | <0.005 | 3.0 | 0.91 | 60 | ○ |
| C27 | | | 0.2 | 2.4 | 0.80 | | | 3.0 | 0.91 | | ○ |
| C28 | | | 0.5 | 2.4 | 0.80 | | | 3.0 | 0.88 | | ○ |
| C29 | | | 1.0 | 2.4 | 0.80 | | | 3.0 | 0.83 | | ○ |
| C30 | | | 1.5 | 2.4 | 0.80 | | | 3.0 | 0.77 | | ○ |
| C31 | | | 0.1 | 3.0 | 0.20 | | | 15.0 | 0.17 | 35 | ◉ |
| C32 | | | 0.2 | 3.0 | 0.20 | | | 15.0 | 0.17 | | ◉ |
| C33 | | | 0.5 | 3.0 | 0.20 | | | 15.0 | 0.17 | | ◉ |
| C34 | | | 1.0 | 3.0 | 0.20 | | | 15.0 | 0.16 | | ◉ |
| C35 | | | 1.5 | 3.0 | 0.20 | | | 15.0 | 0.14 | | ◉ |
| C36 | | | 0.1 | 3.0 | 0.60 | | | 5.0 | 0.33 | 35 | ◉ |
| C37 | | | 0.2 | 3.0 | 0.60 | | | 5.0 | 0.33 | | ◉ |
| C38 | | | 0.5 | 3.0 | 0.60 | | | 5.0 | 0.32 | | ◉ |
| C39 | | | 1.0 | 3.0 | 0.60 | | | 5.0 | 0.30 | | ◉ |

TABLE 5-continued

| SPECIMEN | COMPOSITION (mass %) | | | | | | | CORROSION RATE | CORROSION RATE | CORROSION |
|---|---|---|---|---|---|---|---|---|---|---|
| No. | Al | Mn | R.E. | Zn | Cu | Ni | Fe | Zn/Cu | [mg/cm$^{-2}$/day$^{-1}$] SUSCEPTIBILITY | RESISTANCE |
| C40 | | | 1.5 | 3.0 | 0.60 | | | 5.0 | 0.27 | ◉ |
| C41 | | | 0.1 | 3.0 | 1.00 | | | 3.0 | 0.81 | 35 ○ |
| C42 | | | 0.2 | 3.0 | 1.00 | | | 3.0 | 0.80 | ○ |
| C43 | | | 0.5 | 3.0 | 1.00 | | | 3.0 | 0.77 | ○ |
| C44 | | | 1.0 | 3.0 | 1.00 | | | 3.0 | 0.77 | ○ |
| C45 | | | 1.5 | 3.0 | 1.00 | | | 3.0 | 0.72 | ○ |
| C46 | | | 0.1 | 5.0 | 0.20 | | | 25.0 | 0.17 | 32 ◉ |
| C47 | | | 0.2 | 5.0 | 0.20 | | | 25.0 | 0.17 | ◉ |
| C48 | | | 0.5 | 5.0 | 0.20 | | | 25.0 | 0.16 | ◉ |
| C49 | | | 1.0 | 5.0 | 0.20 | | | 25.0 | 0.16 | ◉ |
| C50 | | | 1.5 | 5.0 | 0.20 | | | 25.0 | 0.15 | ◉ |

TABLE 6

| SPECIMEN | COMPOSITION (mass %) | | | | | | | CORROSION RATE | CORROSION RATE | CORROSION |
|---|---|---|---|---|---|---|---|---|---|---|
| No. | Al | Mn | R.E. | Zn | Cu | Ni | Fe | Zn/Cu | [mg/cm$^{-2}$/day$^{-1}$] SUSCEPTIBILITY | RESISTANCE |
| C51 | 9.0 | 0.3 | 0.1 | 5.0 | 0.60 | <0.002 | <0.005 | 8.3 | 0.30 | 32 ◉ |
| C52 | | | 0.2 | 5.0 | 0.60 | | | 8.3 | 0.29 | ◉ |
| C53 | | | 0.5 | 5.0 | 0.60 | | | 8.3 | 0.29 | ◉ |
| C54 | | | 1.0 | 5.0 | 0.60 | | | 8.3 | 0.29 | ◉ |
| C55 | | | 1.5 | 5.0 | 0.60 | | | 8.3 | 0.27 | ◉ |
| C56 | | | 0.1 | 6.0 | 0.00 | | | — | 0.16 | 30 ◉ |
| C57 | | | 0.2 | 6.0 | 0.00 | | | — | 0.16 | ◉ |
| C58 | | | 0.5 | 6.0 | 0.00 | | | — | 0.16 | ◉ |
| C59 | | | 1.0 | 6.0 | 0.00 | | | — | 0.16 | ◉ |
| C60 | | | 1.5 | 6.0 | 0.00 | | | — | 0.15 | ◉ |
| C61 | | | 0.1 | 6.0 | 0.40 | | | 15.0 | 0.29 | 30 ◉ |
| C62 | | | 0.2 | 6.0 | 0.40 | | | 15.0 | 0.28 | ◉ |
| C63 | | | 0.5 | 6.0 | 0.40 | | | 15.0 | 0.27 | ◉ |
| C64 | | | 1.0 | 6.0 | 0.40 | | | 15.0 | 0.26 | ◉ |
| C65 | | | 1.5 | 6.0 | 0.40 | | | 15.0 | 0.26 | ◉ |
| C66 | | | 0.1 | 6.0 | 1.00 | | | 6.0 | 0.88 | 30 ○ |
| C67 | | | 0.2 | 6.0 | 1.00 | | | 6.0 | 0.87 | ○ |
| C68 | | | 0.5 | 6.0 | 1.00 | | | 6.0 | 0.81 | ○ |
| C69 | | | 1.0 | 6.0 | 1.00 | | | 6.0 | 0.78 | ○ |
| C70 | | | 1.5 | 6.0 | 1.00 | | | 6.0 | 0.77 | ○ |

TABLE 7

| SPECIMEN | COMPOSITION (mass %) | | | | | | | CORROSION RATE | CORROSION RATE | CORROSION |
|---|---|---|---|---|---|---|---|---|---|---|
| No. | Al | Mn | R.E. | Zn | Cu | Ni | Fe | Zn/Cu | [mg/cm$^{-2}$/day$^{-1}$] SUSCEPTIBILITY | RESISTANCE |
| D01 | 5.0 | 0.3 | 0.5 | 3.0 | 0.50 | <0.002 | <0.005 | 6.0 | 0.37 | 35 ◉ |
| D02 | 7.0 | | | | | | | | 0.33 | ◉ |
| D03 | 9.0 | | | | | | | | 0.29 | ◉ |
| D04 | 10.0 | | | | | | | | 0.35 | ◉ |
| D05 | 10.5 | | | | | | | | 0.39 | ◉ |
| D06 | 11.0 | | | | | | | | 0.44 | ○ |
| D07 | 13.0 | | | | | | | | 0.58 | ○ |

INDUSTRIAL APPLICABILITY

As discussed before, owing to good corrosion resistance in addition to light weight and good specific strength, the recycled magnesium alloy and the magnesium alloy of the present invention can be used in a variety of products, including structural members, casing members, wheels, and other automotive components. The process of the present invention can be used for producing such a useful magnesium alloy.

The invention claimed is:

1. A process for producing a recycled magnesium alloy, comprising:

a melting step of heating and melting a collected raw material comprising a collected magnesium alloy member, thereby obtaining raw material molten metal;

a determining step of determining the content of copper (Cu) in the collected raw material;

an adjusting step of adjusting composition of the raw material molten metal in accordance with the Cu content of the raw material molten metal determined in the determining step, thereby obtaining adjusted molten metal comprising, by mass:
aluminum (Al): 5 to 9.0%,
Cu: 0.1 to 1.0%,
zinc (Zn): not less than 3% and not less than three times of the Cu content (%),
manganese (Mn): 0.1 to 1.5%, and
the remainder: magnesium (Mg) and impurities with or without one or more reforming elements; and
a solidifying step of cooling and solidifying the adjusted molten metal, thereby obtaining a recycled magnesium alloy.

2. The process for producing a recycled magnesium alloy according to claim 1, wherein the adjusting step is a step of making the adjusted molten metal further contain 0.1 to 1.5% of one or more rare earth elements (R.E.).

3. The process for producing a recycled magnesium alloy according to claim 2, wherein the raw material molten metal contains not less than 0.001% of nickel (Ni).

4. The process for producing a recycled magnesium alloy according to claim 1, wherein the adjusting step is a step of making the Zn content of the adjusted molten metal not more than 6%.

5. The process for producing a recycled magnesium alloy according to claim 1, wherein the adjusting step is a step of making the content of Ni, which is one of the impurities, of the adjusted molten metal not more than 0.05%.

6. The process for producing a recycled magnesium alloy according to claim 1, wherein the Al is from 8 to 9.0% by mass.

* * * * *